(12) United States Patent
Tanaka

(10) Patent No.: US 7,327,666 B2
(45) Date of Patent: Feb. 5, 2008

(54) OPTICAL RECORDING MEDIUM AND METHOD OF MANUFACTURING SAME

(75) Inventor: Toshifumi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 490 days.

(21) Appl. No.: 10/490,897

(22) PCT Filed: Sep. 20, 2002

(86) PCT No.: PCT/JP02/09738

§ 371 (c)(1),
(2), (4) Date: Mar. 26, 2004

(87) PCT Pub. No.: WO03/030154

PCT Pub. Date: Oct. 4, 2003

(65) Prior Publication Data

US 2004/0240373 A1    Dec. 2, 2004

(30) Foreign Application Priority Data

Sep. 28, 2001   (JP)   ............... 2001-298999

(51) Int. Cl.
*G11B 7/24*   (2006.01)
(52) U.S. Cl. .............. 369/275.2; 369/288; 430/270.13; 428/64.4
(58) Field of Classification Search ............. 369/30.36, 369/288, 275.1–275.5, 283; 428/64.1–64.6; 430/270.13, 945, 269
See application file for complete search history.

(56) References Cited

U.S. PATENT DOCUMENTS

| | | | |
|---|---|---|---|
| 6,096,399 A * | 8/2000 | Yoshinari et al. | 428/64.1 |
| 6,242,157 B1* | 6/2001 | Tominaga et al. | 430/270.13 |
| 6,406,772 B2* | 6/2002 | Tominaga et al. | 428/64.1 |
| 6,537,721 B2* | 3/2003 | Inoue et al. | 430/269 |

FOREIGN PATENT DOCUMENTS

| | | |
|---|---|---|
| JP | 62-250533 | 10/1987 |
| JP | 07-098872 | 4/1995 |
| JP | 09-120538 | 5/1997 |
| JP | 11-025456 | 1/1999 |
| JP | 2000-036130 | 2/2000 |
| JP | 2000-285469 | 10/2000 |

* cited by examiner

*Primary Examiner*—Ali Neyzari
(74) *Attorney, Agent, or Firm*—Seed IP Law Group PLLC

(57) ABSTRACT

An optical recording medium has a plurality of laminated information recording layers. The average reflectivity within a stipulated range in the unrecorded regions of at least one of the information recording layers has a value between the reflectivity in the crystalline state and the reflectivity in the amorphous state. When the focus of the laser beam is aligned to one information recording layer, the difference in reflectivity is small between the case in which those regions of the other information recording layer on which the beam spot shines is a recorded region and the case in which it is an unrecorded region, and even in the case that a boundary between a recorded region and an unrecorded region is present within the beam spot, the distribution of reflectivity within the beam spot becomes constant, so the stable recording and/or playback can be performed.

2 Claims, 15 Drawing Sheets

OPTICAL RECORDING MEDIUM AND METHOD OF MANUFACTURING SAME

BACKGROUND OF THE INVENTION

The present invention relates to an optical recording medium and a method of manufacturing same, and particularly to an optical recording medium that has a plurality of laminated recording layers and a method of manufacturing same.

DESCRIPTION OF THE PRIOR ART

Optical recording media typified by the CD and the DVD have been widely used as recording media for recording digital data. The recording capacity demanded of such optical recording media has increased year by year, and various proposals have been made to achieve this. One of these proposals is a technique that uses a two-layer structure for the information recording layers contained in the optical recording media, which has found practical application in the DVD-Video and DVD-ROM formats which are read-only optical storage media. With such read-only optical recording media, pre-pits formed on the substrate surface become the information recording layer, and such substrates have a laminated structure with an intervening intermediate layer.

In addition, in recent years, proposals have been made for optical recording media with a two-layer structure for the information recording layer to be used also as a user-recordable optical recording medium. Such a recordable optical recording medium has a structure in which a recording film and dielectric films between which they are sandwiched form an information recording layer, and these information recording layers are laminated.

In the playback of data from these optical recording media, the focus of a laser beam set to the playback power level is aligned to one or the other of the information recording layers and the amount of reflected light is detected. Accordingly, when data recorded on the lower information recording layer (the information recording layer on the side farthest from the incident-light surface) is played back, the laser beam is shined through the upper information recording layer (the information recording layer on the side nearest the incident-light surface) and the reflected light enters the optical system after passing through the upper information recording layer.

In this manner, in an optical recording medium having two information recording layers, the playback of data recorded on the lower information recording layer is performed through the upper information recording layer, so the amount of light reflected from the lower information recording layer is affected by the upper information recording layer. In a user-recordable optical recording medium in particular, the light transmittance of the information recording layer is lower than the light transmittance of the information recording layer of a read-only optical recording medium, so this effect is even more marked.

Specifically, in a user-recordable optical storage medium, a large number of recording marks will be formed in those regions of the information recording layer where data is recorded (recorded regions) while no recording marks at all will be formed in those regions where no data is recorded (unrecorded regions), so when data recorded on the lower information recording layer is played back, the amount of reflected light obtained is different depending on whether the upper information recording layer positioned above that area is a recorded region or an unrecorded region. In particular, when data recorded on the lower information recording layer is played back, a problem occurs when the portion of the upper information recording layer positioned above it corresponds to a border between a recorded region and an unrecorded region, so the reflectivity distribution is not constant within the spot of the laser beam shined during playback, thus impeding the stable detection of the amount of light reflected.

This phenomenon will be described in detail with reference to the drawings.

FIG. 14 is a schematic cross section illustrating the path of the laser beam at the time that the laser beam is focused on the lower information recording layer 1 during playback in three cases: when the upper information recording layer 2 positioned above it is a recorded region (laser position A), when it is an unrecorded region (laser position B), and when it is a boundary portion between the recorded region and unrecorded region (laser position C). Note that in this figure, 3 is a light transmission layer, 4 is an intermediate layer and 5 is the substrate. Both the light transmission layer 3 and intermediate layer 4 are made of transparent materials.

FIGS. 15(a)-(c) are schematic top views of the state within the beam spot shined onto the upper information recording layer 2 during playback when the laser beam is at the laser positions A, B and C, respectively.

As shown in FIG. 15(a), when the laser beam is at laser position A during playback, a large number of recording marks M is present within the beam spot shined onto the upper information recording layer 2. Specifically, when the information recording layers 1 and 2 of this information recording medium contain a phase-change type of recording film, the reflectivity of the portions where recording marks M are formed typically becomes lower than the reflectivity between recording marks where no recording marks M are formed. For this reason, the average reflectivity within the beam spot shined on the upper information recording layer 2 becomes a value roughly intermediate between the reflectivity of portions where recording marks M are formed and the reflectivity of portions where no recording marks M are formed.

In addition, as shown in FIG. 15(b), when the laser beam is at laser position B during playback, no recording marks M at all are present within the beam spot shined onto the upper information recording layer 2. Thus, the average reflectivity within the beam spot shined on the upper information recording layer 2 matches the reflectivity of portions where no recording marks M are formed.

Moreover, as shown in FIG. 15(c), when the laser beam is at laser position C during playback, within the beam spot shined onto the upper information recording layer 2, a large number of recording marks M is present in one region (toward the inside) divided along the tracks while no recording marks M at all are present in the other region (toward the outside). Thus, fluctuations occur in the distribution of reflectivity within the beam spot shined on the upper information recording layer 2.

In this manner, in a conventional optical recording medium having two information recording layers, the amount of light reflected from the lower information recording layer 1 fluctuates depending on the state of the upper information recording layer 2, so there is a risk that the stable playback of data may become difficult. Particularly when a boundary between the recorded region and the unrecorded region is contained within the beam spot shined onto the upper information recording layer 2 when reading data from the lower information recording layer 1 (at laser position C), the reflectivity distribution within the beam spot is not constant, so a problem arises in that there is a heightened risk of the stable playback of data becoming difficult.

In addition, the point where the laser beam is shined onto the lower information recording layer 1 through the upper information recording layer 2 is also the same during the recording of data, so also when recording data to the lower information recording layer 1, there is a risk of this being affected by the state of the upper information recording layer 2 and the stable recording of data being impaired.

One technique of solving this problem is the method disclosed in Japanese Patent Laid Open No. 2000-285469. The method disclosed in this publication involves recording data in order starting from the upper information recording layer and only when no unrecorded regions are left on the upper information recording layer is data then recorded on the lower information recording layer. However, this method greatly limits the random access character which is an advantage of ordinary optical recording media, and also it is not possible to use replacements for bad sectors, so convenience is significantly lost. In addition, there is also a problem in that special control is required on the drive side, thus limiting its general purpose character.

SUMMARY OF THE INVENTION

Accordingly, an object of the present invention is to provide an improved optical recording medium having a plurality of laminated information recording layers.

In addition, another object of the present invention is to provide an improved optical recording medium having a plurality of laminated information recording layers, wherein the recording and/or playback of data to or from one information recording layer is less affected by fluctuations in other information recording layers.

In addition, a still other object of the present invention is to provide an improved optical recording medium having a plurality of laminated information recording layers, wherein the recording and/or playback of data to or from one information recording layer is less affected by fluctuations in the recording conditions and/or playback conditions depending on whether other information recording layers in corresponding positions are in the recorded state or unrecorded state at the time.

These objects of the present invention are achieved by an optical recording medium that has a plurality of laminated information recording layers, where information can be recorded by changing the state of various portions of at least one information recording layer among said plurality of information recording layers to either a first state or a second state, which have reflectivity different from each other, wherein: the optical recording medium is characterized in that the average reflectivity within a stipulated range in the unrecorded regions of at least one of the information recording layers among said plurality of information recording layers has a value between the reflectivity in said first state and the reflectivity in said second state.

With the present invention, when the focus of the laser beam is aligned to one information recording layer, the difference in reflectivity is small between the case in which those regions of the other information recording layer on which the beam spot shines is a recorded region and the case in which it is an unrecorded region, and even in the case that a boundary between a recorded region and an unrecorded region is present within the beam spot, the distribution of reflectivity within the beam spot becomes constant, so stable recording/playback can be performed.

In a preferred embodiment of the present invention, said plurality of information recording layers contain a phase-change type recording film.

In a further preferred embodiment of the present invention, said first state is the amorphous state and said second state is the crystalline state.

In a further preferred embodiment of the present invention, said stipulated range is equivalent to the diameter of the laser beam shined on another information recording layer when the spot of the laser beam is effectively shined onto one information recording layer.

In a further preferred embodiment of the present invention, said other information recording layer is positioned more toward the incident-light side than said one information recording layer.

In a further preferred embodiment of the present invention, nearly the entire surface of said unrecorded regions is put into said first state or said second state in a regular fashion.

In a further preferred embodiment of the present invention, minute recording marks are formed over nearly the entire surface of said unrecorded regions.

With these further preferred embodiments of the present invention, there is no need to use any special apparatus, but rather an ordinary data recording apparatus can be used to make the average reflectivity of the unrecorded regions within the stipulated range a value between the reflectivity in the first state and the reflectivity in the second state.

In another preferred embodiment of the present invention, rectangular amorphous regions with their length in the direction along the track shorter than their length in the direction perpendicular to the track are formed over nearly the entire surface of said unrecorded regions.

In another further preferred embodiment of the present invention, said length in the direction along the track of said amorphous regions is shorter than the diameter defining said stipulated range.

With these further preferred embodiments of the present invention, the effects of the presence of these rectangular regions on tracking are decreased.

In another further preferred embodiment of the present invention, said unrecorded region has an average reflectivity almost everywhere of a value between the reflectivity in said first state and the reflectivity in said second state.

With these other preferred embodiments of the present invention, it is possible to bring the average reflectivity of the unrecorded regions within said stipulated range to a value between the reflectivity in said first state and the reflectivity in said second state more quickly.

These objects of the present invention are also achieved by a method of manufacturing an optical recording medium that has a plurality of laminated information recording layers, wherein said method of manufacturing an optical recording medium comprises: a step of performing fusion-initialization of at least one information recording layer among said plurality of information recording layers, and a step of forming minute recording marks over nearly the entire surface of said fusion-initialized information recording layer.

These objects of the present invention are also achieved by a method of manufacturing an optical recording medium that has a plurality of laminated information recording layers, wherein said method of manufacturing an optical recording medium comprises: a step of forming rectangular amorphous regions and crystalline regions with their length in the direction along the track shorter than their length in the direction perpendicular to the track over nearly the entire surface of said unrecorded regions, radially with approximately 50% duty.

These objects of the present invention are also achieved by a method of manufacturing an optical recording medium that has a plurality of laminated information recording layers, wherein said method of manufacturing an optical recording medium comprises: a step of performing solid-phase initialization of at least one information recording layer among said plurality of information recording layers.

DESCRIPTION OF THE PREFERRED EMBODIMENTS

Preferred embodiments of the present invention will be explained in detail with reference to the drawings.

Figure 1:
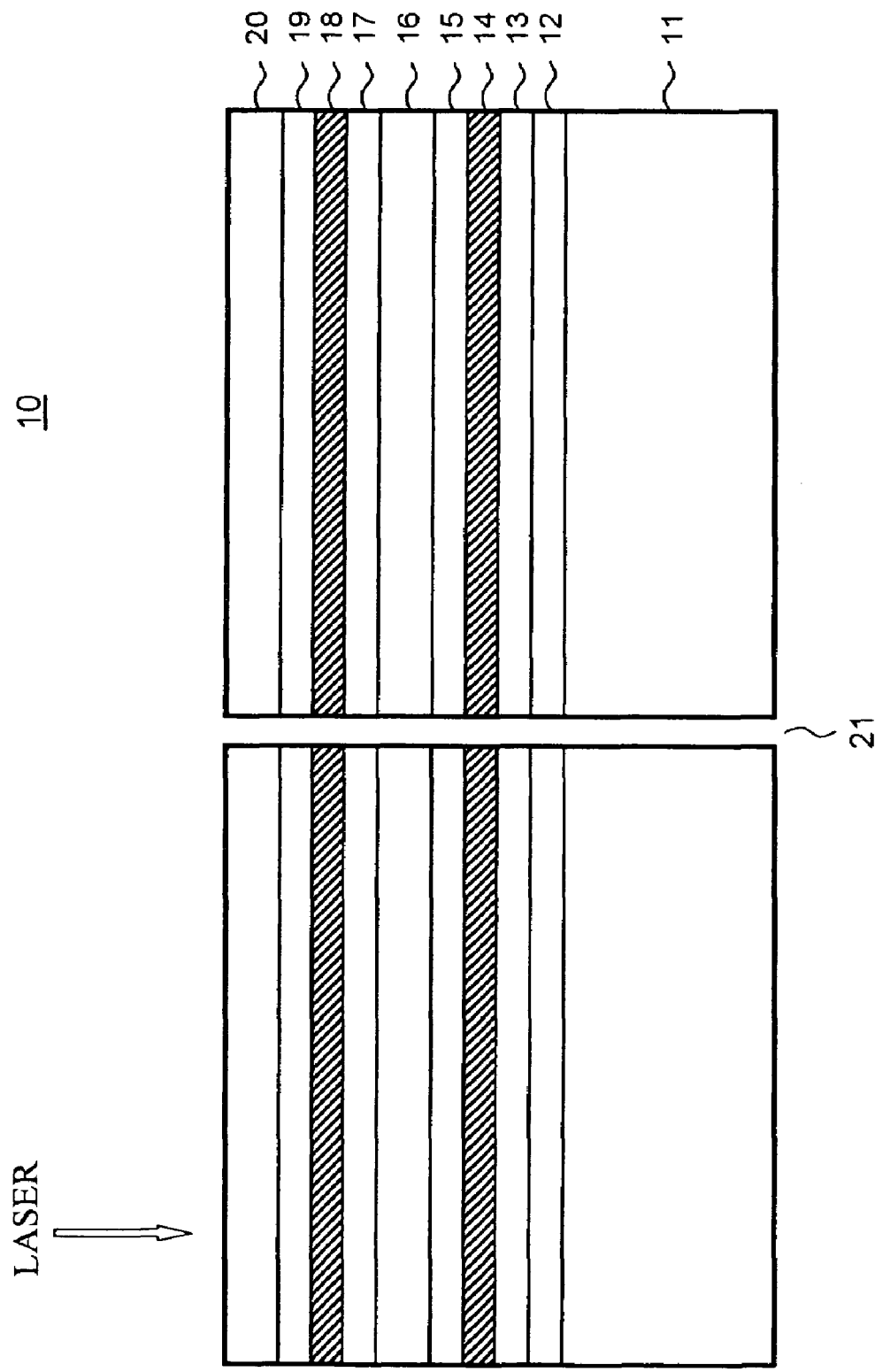
FIG. 1 is a schematic cross section illustrating the structure of an optical recording medium 10 according to a preferred embodiment of the present invention.

FIG. 1 is a schematic cross section illustrating the structure of an optical recording medium 10 according to a preferred embodiment of the present invention.

As shown in FIG. 1, the optical recording medium 10 according to this preferred embodiment consists of a polycarbonate substrate 11 with a thickness of approximately 1.1 mm, a reflective layer 12 made of an alloy with silver as its main constituent with a thickness of approximately 50 nm, a fourth dielectric layer 13 made of $ZnS$—$SiO_2$ with a thickness of approximately 90 nm, a lower recording film 14 made of AgInSbTe with a thickness of approximately 10 nm, a third dielectric layer 15 made of $ZnS$—$SiO_2$ with a thickness of approximately 90 nm, an intermediate layer 16 made of ultraviolet curable acrylic resin with a thickness of approximately 0.02 mm, a second dielectric layer 17 made of $ZnS$—$SiO_2$ with a thickness of approximately 80 nm, an upper recording layer 18 made of AgInSbTe with a thickness of approximately 6 nm, a first dielectric layer 19 made of $ZnS$—$SiO_2$ with a thickness of approximately 50 nm, and a light transmission layer 20 made of ultraviolet curable acrylic resin with a thickness of approximately 0.08 mm. In addition, a hole 21 is provided in the center of the optical recording medium 10. Note that the fourth dielectric layer 13 and third dielectric layer 15 provided with the lower recording film 14 sandwiched between them function as a protective film for the lower recording film 14, while the second dielectric layer 17 and first dielectric layer 19 provided with the upper recording film 18 sandwiched between them function as a protective film for the upper recording film 18.

With this constitution, the lower recording film 14, fourth dielectric layer 13, and third dielectric layer 15 constitute the lower information recording layer, while the upper recording film 18, second dielectric layer 17, and first dielectric layer 19 constitute the upper information recording layer.

While omitted from FIG. 1, pre-grooves are formed on both the substrate 11 and the intermediate layer 16, so during the recording/playback of data, the laser beam is shined along them.

When data is read from an optical recording medium 10 having such a structure, a laser beam with a wavelength of approximately 405 nm, for example, set to the playback power level is shined from the light transmission layer 20 side, and the focus is aligned to the lower recording film 14 or upper recording film 18. Here, the AgInSbTe making up the lower recording film 14 and upper recording film 18 is a phase-change compound, having a different optical reflectivity in the crystalline state than in the amorphous state, so by shining a laser beam from the light transmission layer 20 side, adjusting the focus to either the lower recording film 14 or upper recording film 18 and detecting the amount of light reflected, it is possible to discern whether or not the lower recording film 14 or upper recording film 18 is in the crystalline state or amorphous state in the portion on which the laser beam is shined. If the lower recording film 14 or upper recording film 18 is made of AgInSbTe as described above, in the lower recording layer, the optical reflectivity in the case that the lower recording film 14 is in the crystalline state becomes approximately 35%, and the optical reflectivity in the case that the upper recording film 18 is in the amorphous state becomes approximately 18%. In addition, in the upper recording layer, the optical reflectivity in the case that the upper recording film 18 is in the crystalline state becomes approximately 9%, and the optical reflectivity in the case that it is in the amorphous state becomes approximately 5%.

Figure 2:
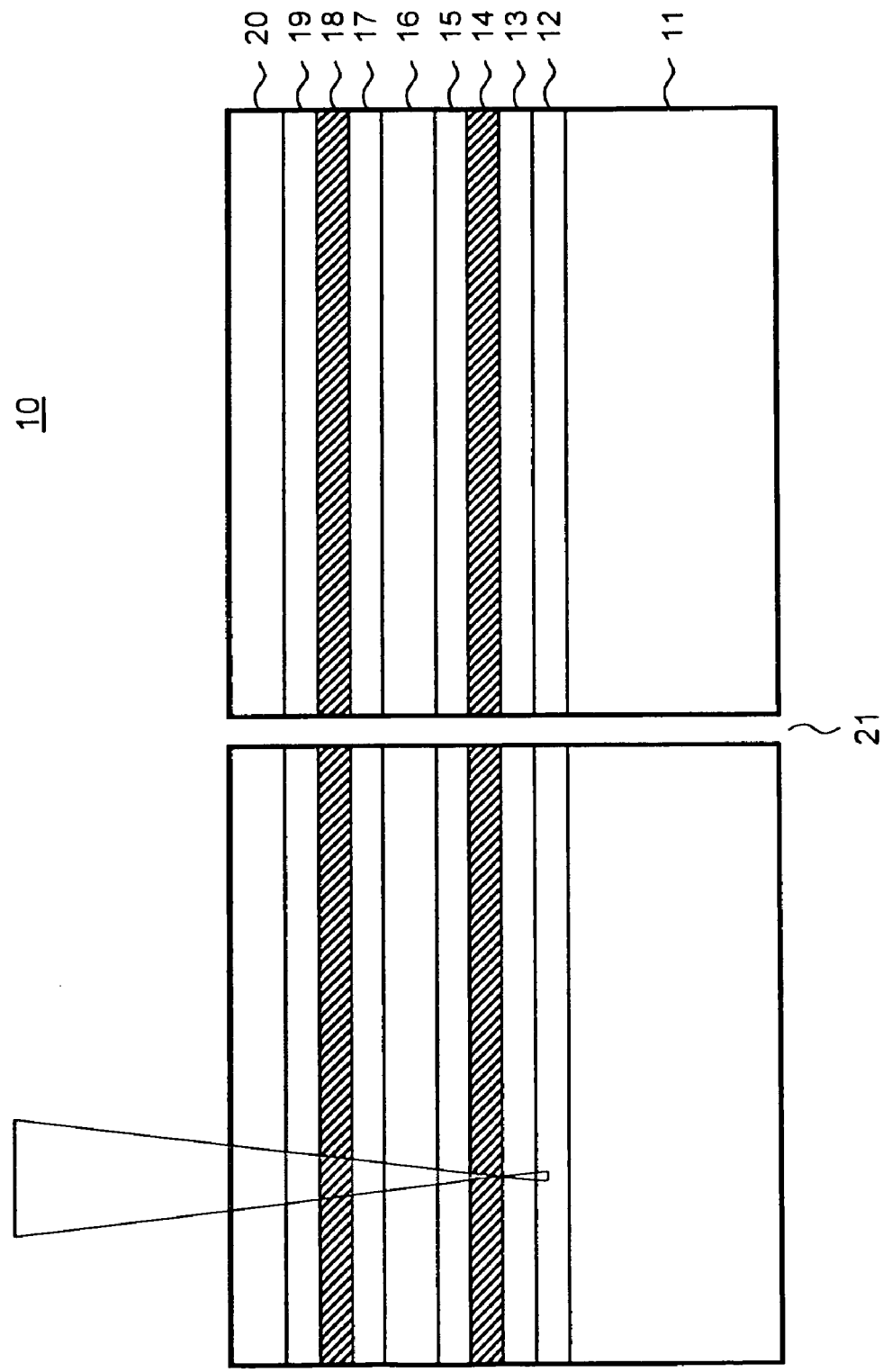
FIG. 2 is a schematic cross section illustrating the path of the laser beam when the focus is aligned to the lower recording film 14 during playback.

Here, as shown in FIG. 2, if the focus is aligned to the lower recording film 14 during playback, the laser beam thus shined passes through the lower recording film 14, is reflected by the reflective layer 12, passes again through the lower recording film 14 and exits from the light transmission layer 20. At this time, the upper recording film 18 is present before the laser beam reaches the lower recording film 14, and also before the light reflected from the reflective layer 12 reaches the light transmission layer 20, so the amount of reflected light that exits from the light transmission layer 20 is affected not only by the state of the lower recording film 14 but also the state of the upper recording film 18. Naturally, in the state in which the focus is aligned to the lower recording film 14, the beam spot of the laser beam is effectively narrowed to a minimum size at the lower recording film 14, but becomes a sufficiently larger size in the upper recording film 18, so the amount of reflected light that exits from the light transmission layer 20 depends mainly on the state of the lower recording film 14.

Figure 3:
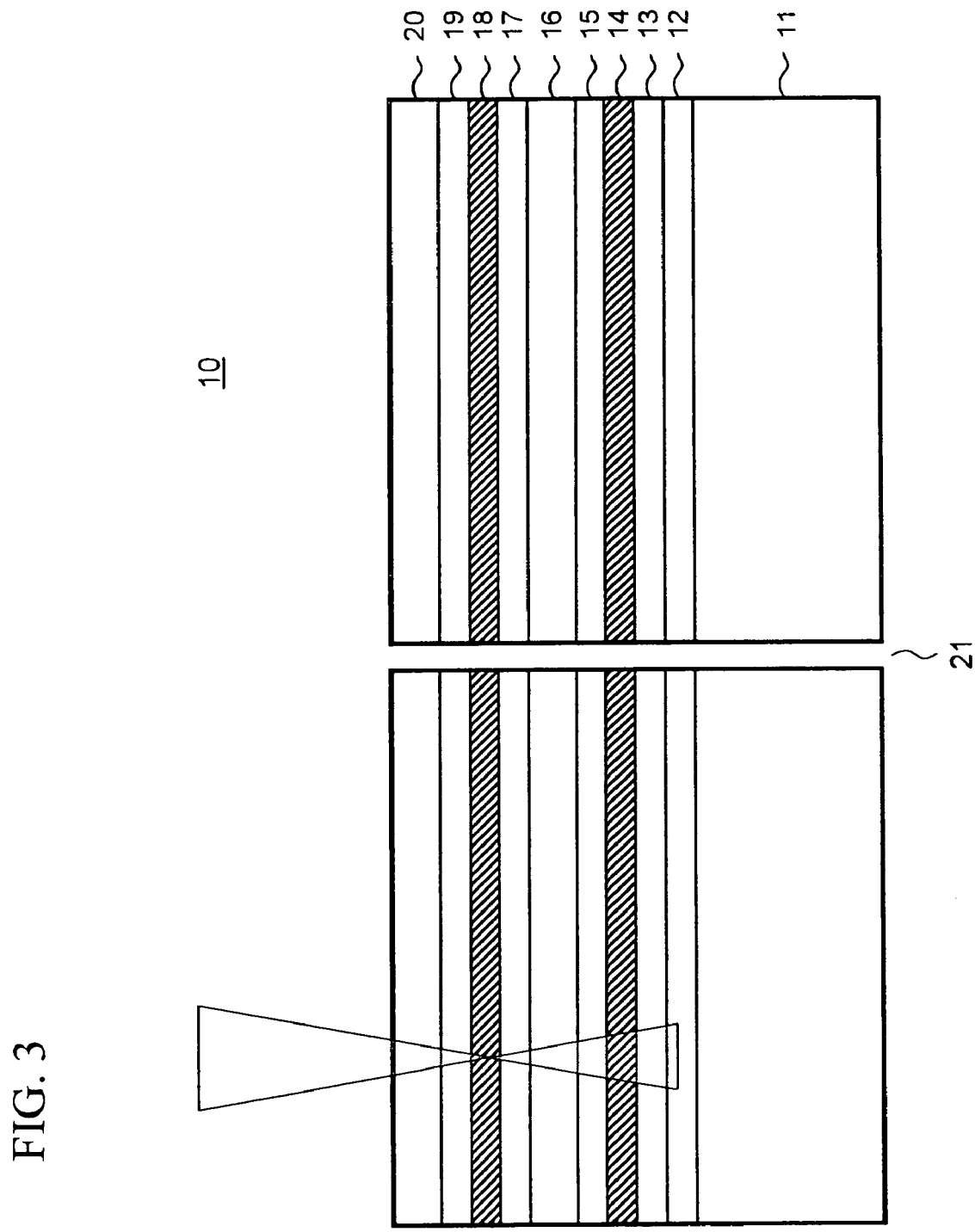
FIG. 3 is a schematic cross section illustrating the path of the laser beam when the focus is aligned to the upper recording film 18 during playback.

On the other hand, as shown in FIG. 3, if the focus is aligned to the upper recording film 18 during playback, the laser beam thus shined passes through the upper recording film 18, is reflected by the reflective layer 12, passes again through the upper recording film 18 and exits from the light transmission layer 20. At this time, the lower recording film 14 is present before the laser beam passing through the upper recording film 18 reaches the reflective layer 12, and also before the light reflected from the reflective layer 12 reaches the upper recording film 18, so the amount of reflected light that exits from the light transmission layer 20 is affected not only by the state of the upper recording film 18 but also the state of the lower recording film 14. Naturally, in the state in which the focus is aligned to the upper recording film 18, the beam spot of the laser beam is effectively narrowed to a minimum size at the upper recording film 18, but becomes a sufficiently larger size in the lower recording film 14, so the amount of reflected light that exits from the light transmission layer 20 depends mainly on the state of the upper recording film 18.

In addition, when writing to the optical recording medium 10, a laser beam with a wavelength of approximately 405 nm, for example, and its intensity modulated is shined from the light transmission layer 20 side, and the focus is aligned to the lower recording film 14 or upper recording film 18. Thereby, the state of the portion of the lower recording film 14 or upper recording film 18 on which the laser beam is shined with its focus aligned thereto is changed to either the crystalline state or the amorphous state. More specifically, if the stipulated portion of the lower recording film 14 or upper recording film 18 is heated to a temperature in excess of its melting point and then rapidly cooled, the portion in question assumes the amorphous state, but if the stipulated portion of the lower recording film 14 or upper recording film 18 is heated to a temperature in excess of its melting point and then slowly cooled, the portion in question assumes the crystalline state. Portions put into the amorphous state are typically called "recording marks." The length of a recording mark from its starting point to its ending point and the length from its ending point to the next recording mark each contain information, and the length of each recording mark and the length between recording marks (edge to edge) are set to one of the lengths corresponding to 2T through 8T (where T is the clock period) when adopting the (1,7) RLL modulation scheme, although this is no particular limitation.

In the optical recording medium 10 according to this preferred embodiment, recording marks of a length corresponding to 2T are formed in advance with a duty of approximately 50% in the unrecorded regions of the lower recording film 14 and upper recording film 18. Accordingly, in the initialized state, recording marks of a length corresponding to 2T are formed over nearly the entire surface of the lower recording film 14 and upper recording film 18 constituting the optical recording medium 10.

Here follows a description of the method of manufacturing an optical recording medium 10 according to this preferred embodiment.

FIGS. 4-8 are step drawings illustrating the method of manufacturing the optical recording medium 10.

Figure 4:
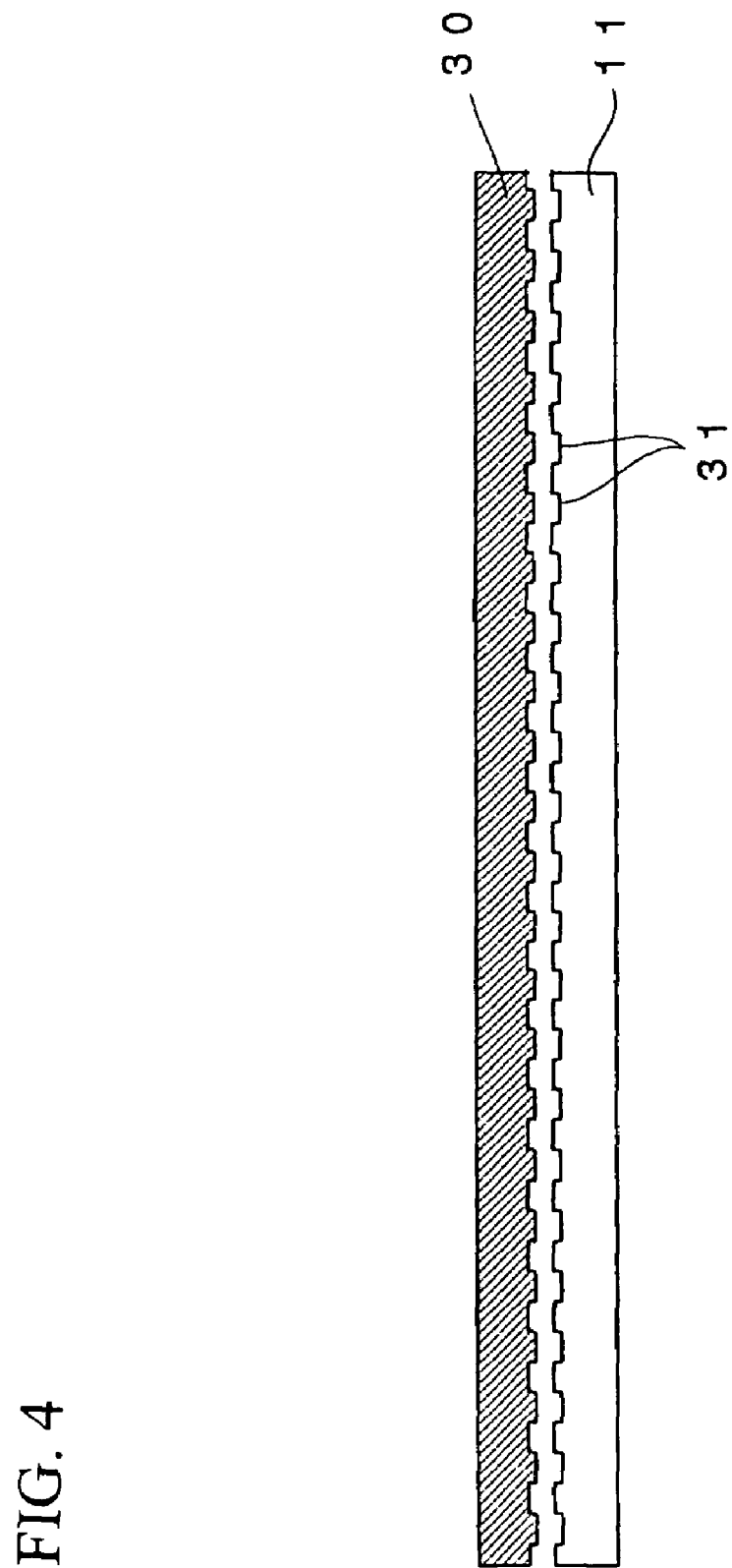
FIGS. 4-8 are step drawings illustrating the method of manufacturing the optical recording medium 10.
Figure 5:
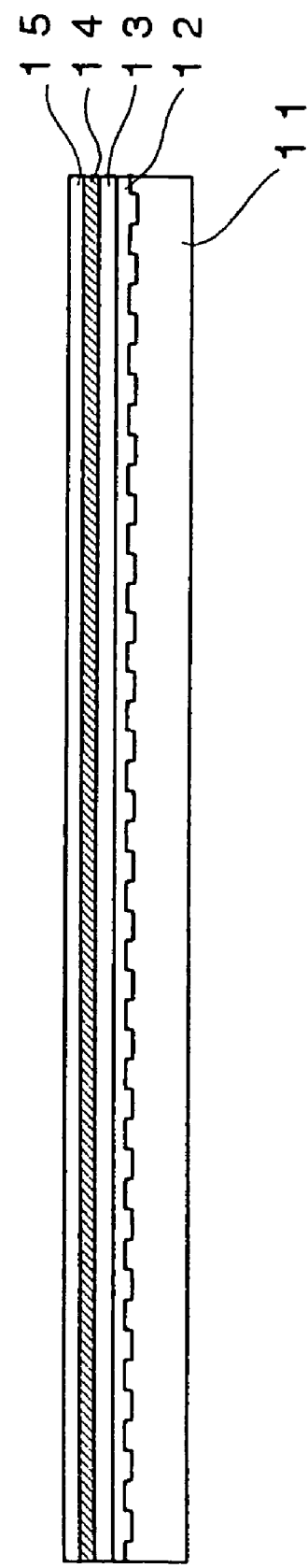

First, as shown in FIG. 4, a stamper 30 is used to perform injection molding of a substrate 11 which is approximately 1.1 mm thick and has a pre-groove 31. Next, as shown in FIG. 5, the sputtering method is used to form, upon nearly the entire surface of the side of the substrate 11 on which the pre-groove 31 is formed, an alloy with silver as its principal constituent, $ZnS$—$SiO_2$, AgInSbTe and $ZnS$—$SiO_2$ in this order, so the reflective layer 12 with a thickness of ~50 nm, fourth dielectric layer 13 with a thickness of ~90 nm, lower recording film 14 with a thickness of ~10 nm, and a third dielectric layer 15 with a thickness of ~120 nm are formed.

Figure 6:
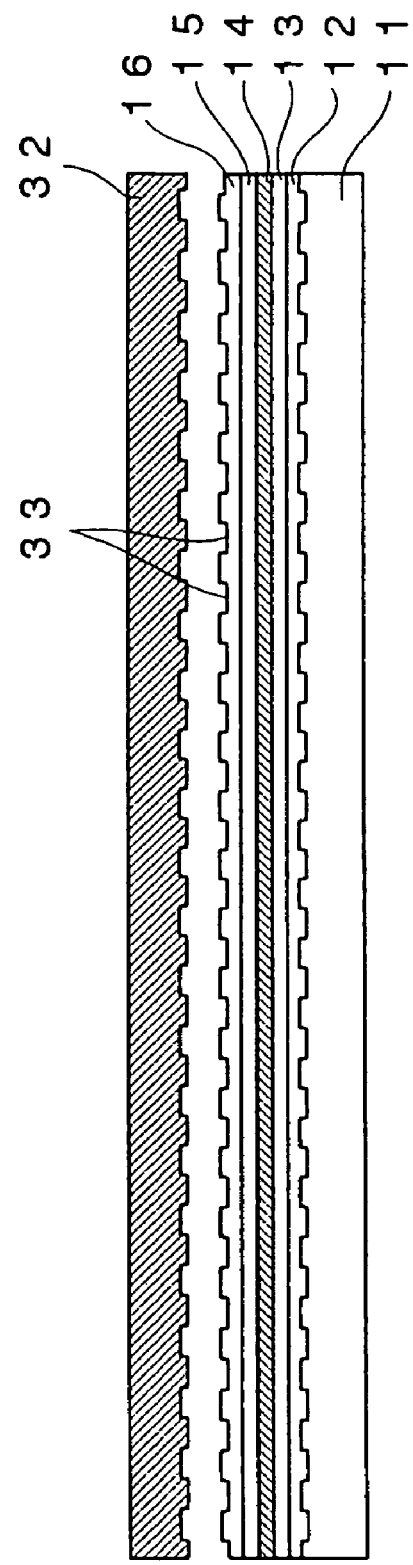

Next, as shown in FIG. 6, ultraviolet curable acrylic resin is spin-coated onto the deposited substrate consisting of the substrate 11 through the third dielectric layer 15, and by shining ultraviolet light through a stamper 32 in the state with its surface covered with the stamper 32, an intermediate layer 16 with a thickness of ~0.02 mm having a pre-groove 33 is formed.

Figure 7:
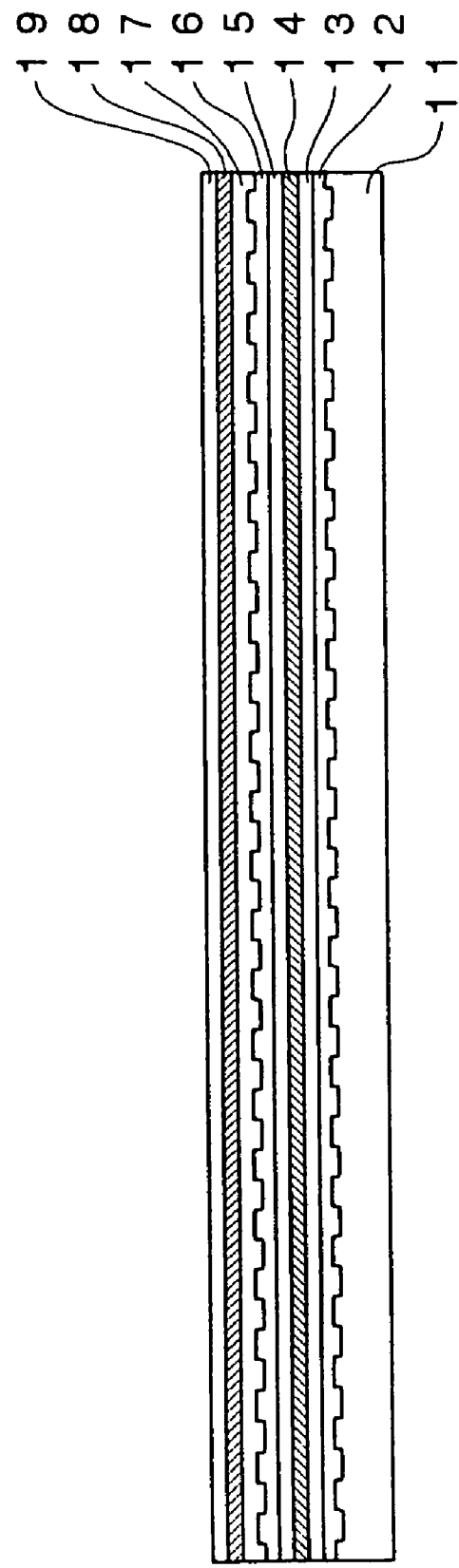

Next, as shown in FIG. 7, the sputtering method is used to form, upon nearly the entire surface of the intermediate layer 16 on which the pre-groove 33 is formed, $ZnS$—$SiO_2$, AgInSbTe and $ZnS$—$SiO_2$ in this order, so the second dielectric layer 17 with a thickness of ~80 nm, upper recording film 18 with a thickness of ~6 nm, and first dielectric layer 19 with a thickness of ~50 nm are formed.

Figure 8:
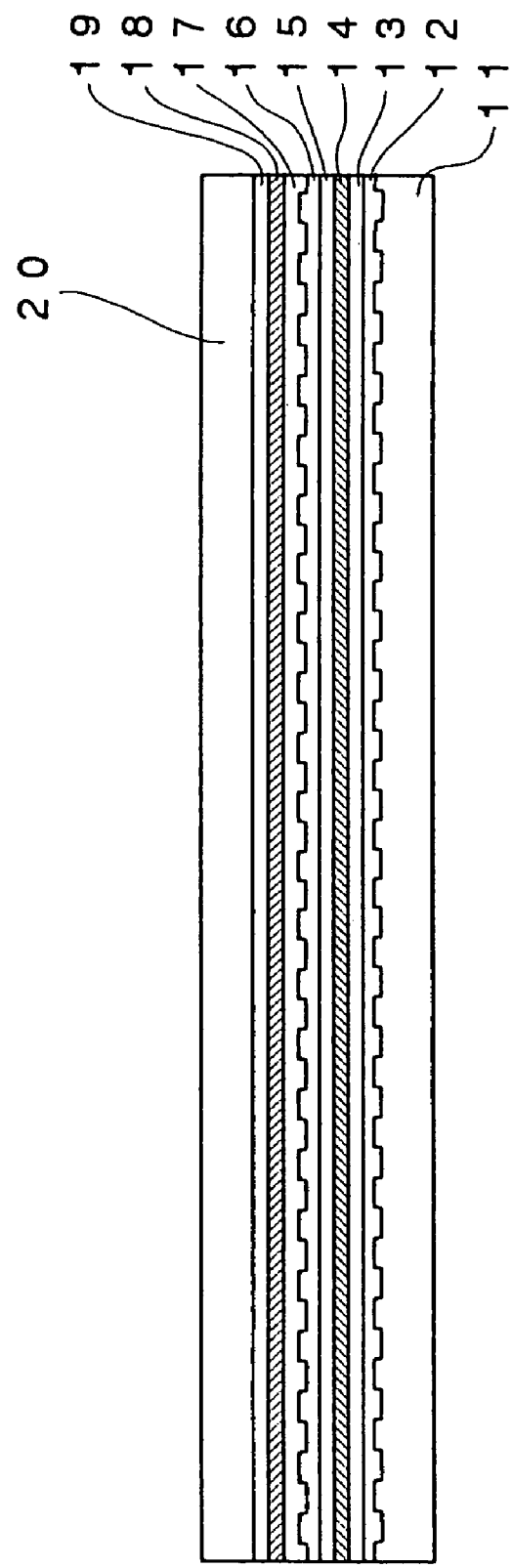

Moreover, as shown in FIG. 8, ultraviolet curable acrylic resin is spin-coated onto the deposited substrate consisting of the substrate 11 through the first dielectric layer 19, and by shining ultraviolet light, a light transmission layer 20 with a thickness of ~0.08 mm is formed. This completes all film deposition steps. In this specification, the optical recording medium in the state with the film deposition steps complete may also be called the "optical recording medium precursor."

Next, the optical recording medium precursor is placed upon the rotary table of a laser irradiation apparatus (not shown) and rotated while being continuously irradiated with a rectangular laser beam having a shorter length in the direction along the track and a longer length in the direction perpendicular to the track. By shifting the irradiation position in the direction perpendicular to the track each time the optical recording medium precursor makes one revolution, the rectangular laser beam can be shined over nearly the entire surface of the lower recording film 14 and upper recording film 18. Thereby, the AgInSbTe making up the lower recording film 14 and upper recording film 18 is heated to a temperature above its melting point and then cooled slowly, so the entire surface of the lower recording film 14 and upper recording film 18 is put into the crystalline state, namely the unrecorded state. This process is called "fusion-initialization" in this specification. When fusion-initialization is performed, the crystal grain size becomes relatively large and thus the reflectivity becomes extremely high. In this specification, the crystalline state after fusion-initialization is called the "first crystalline state," and the regions of the lower recording film 14 and upper recording film 18 assuming the first crystalline state are called the "first crystalline region C1."

Note that when the laser beam power is set to the erase level $P_e$ during recording and shined onto the lower recording film 14 and upper recording film 18, the crystalline state of the lower recording film 14 and upper recording film 18 becomes substantially the same state as the first crystalline state.

Once fusion-initialization is complete, the optical recording medium precursor is placed upon the rotary table of a laser irradiation apparatus (not shown) and rotated while an intensity-modulated laser beam is intermittently shined upon the lower recording film 14 and upper recording film 18, thereby forming recording marks with a length corresponding to 2T over nearly the entire surface of the lower recording film 14 and upper recording film 18 with a duty of approximately 50%. Those portions of he lower recording film 14 and upper recording film 18 on which the recording marks are formed assume the amorphous state and their reflectivity drops, so the average reflectivity of the lower recording film 14 and upper recording film 18 assumes a value between the reflectivity in the amorphous state and the reflectivity in the first crystalline state. Thereby, the optical recording medium 10 according to this preferred embodiment is complete. In this specification, the process of setting the average reflectivity of the lower recording film 14 and/or the upper recording film 18 to a value between the reflectivity in the amorphous state and the reflectivity in the first crystalline state is called "averaging."

As described above, it is possible to record the desired digital data onto an optical recording medium 10 thus manufactured by aligning the focus of the laser beam during recording to either the lower recording film 14 or the upper recording film 18 to form recording marks. In this case, the recording marks of a length corresponding to 2T formed in advance are overwritten by the intensity-modulated laser beam, so in the regions where data is recorded (recorded regions), the recording marks with a length corresponding to 2T formed in advance are erased. In addition, when data is recorded onto the lower recording film 14 and/or upper recording film 18 of the optical recording medium 10 in this manner, as described above, by aligning the focus of a laser beam set to playback power to either the lower recording film 14 or the upper recording film 18 and detecting the amount of light reflected, it is possible to play back the digital data thus recorded.

Figure 9:
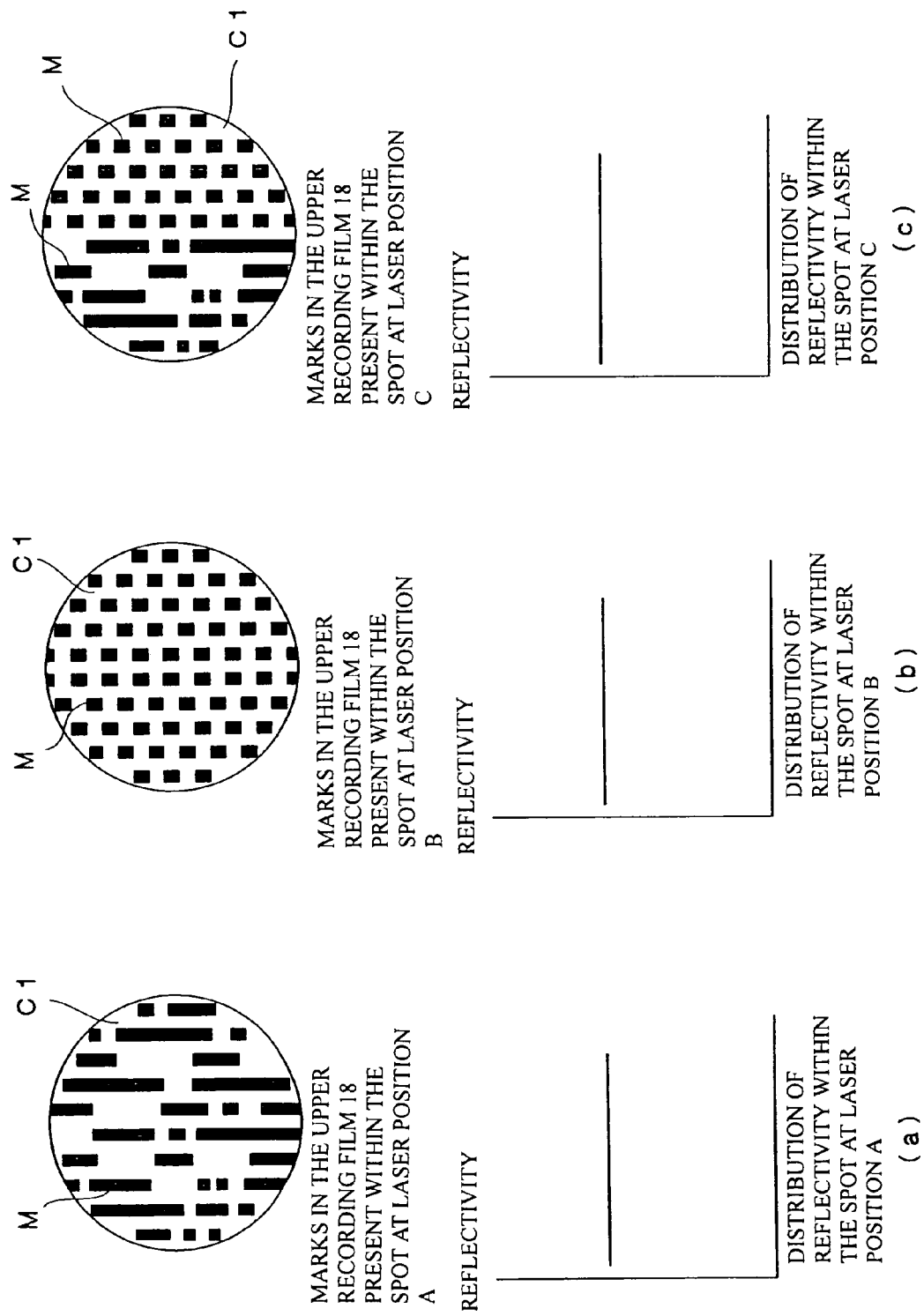
FIGS. 9(a)-(c) are schematic top views of the state within the beam spot shined onto the upper information recording layer 2 during playback when the laser beam is at the laser positions A, B and C, respectively.
Figure 14:
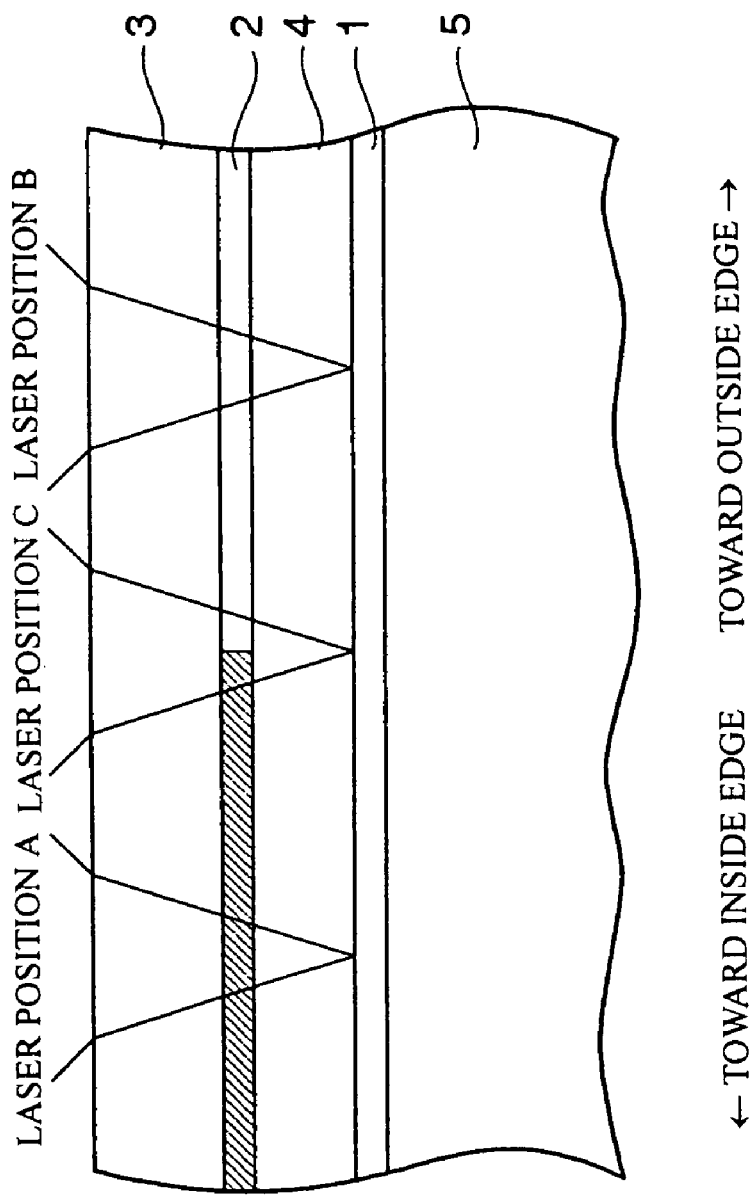
FIG. 14 is a schematic cross section illustrating the path of the laser beam at the time that the laser beam is focused on the lower information recording layer 1 during playback in three cases: when the upper information recording layer 2 positioned above it is a recorded region (laser position A), when it is an unrecorded region (laser position B), and when it is a boundary portion between the recorded region and unrecorded region (laser position C).
Figure 15:
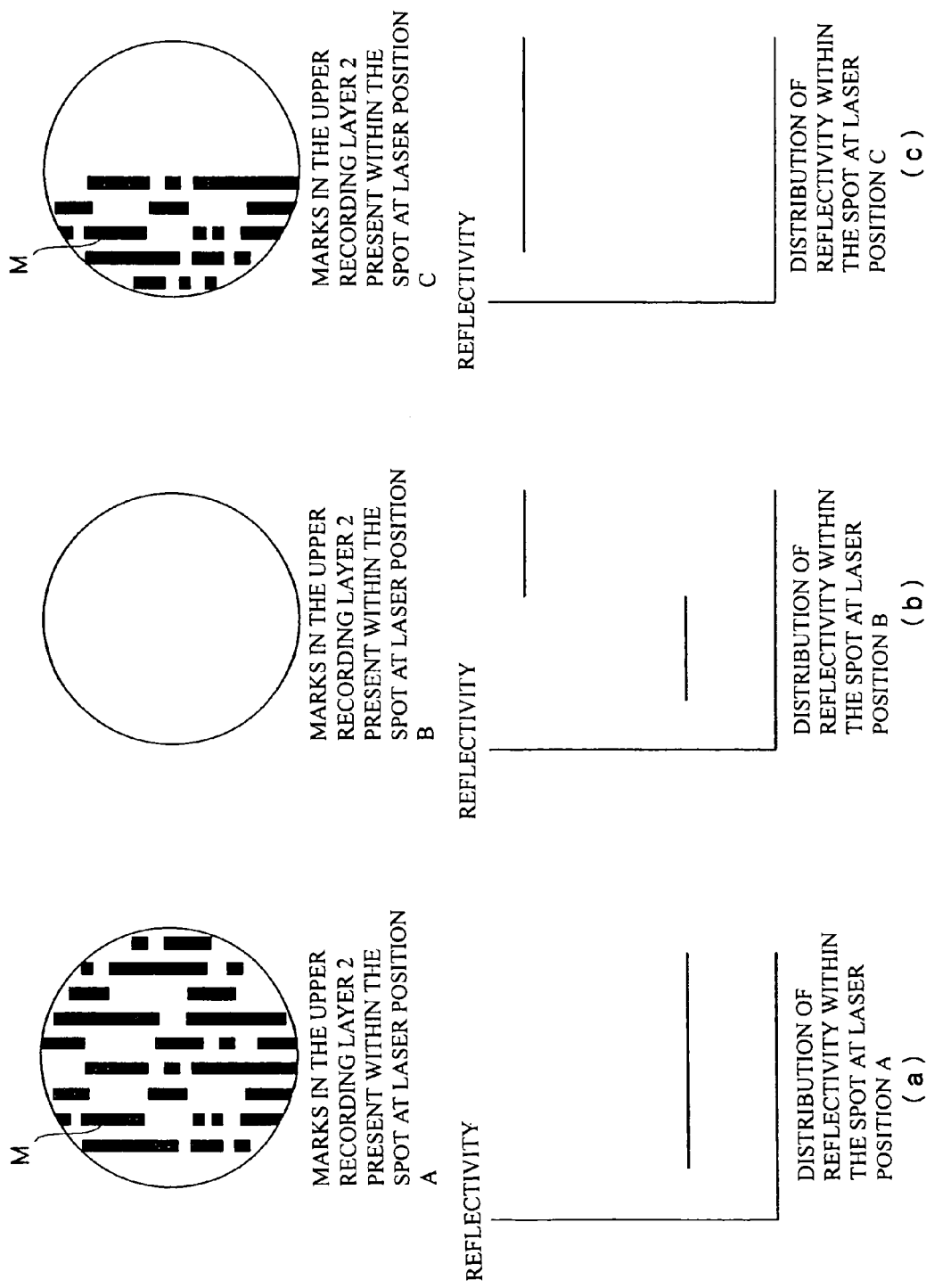
FIGS. 15(a)-(c) are schematic top views of the state within the beam spot shined onto the upper information recording layer 2 during playback when the laser beam is at the laser positions A, B and C, respectively.

FIG. 9(a) is a schematic top view of the phase state within the beam spot shined onto the upper recording film 18 when the focus of the laser beam is aligned to the lower recording film 14 during playback and the upper recording film 18 positioned above it is a recorded region (laser position A shown in FIG. 14). FIG. 9(b) is a schematic top view of the phase state within the beam spot shined onto the upper recording film 18 when the focus of the laser beam is aligned to the lower recording film 14 during playback and the upper recording film 18 positioned above it is an unrecorded region (laser position B shown in FIG. 14). FIG. 9(c) is a schematic top view of the phase state within the beam spot shined onto the upper recording film 18 when the focus of the laser beam is aligned to the lower recording film 14 during playback and the upper recording film 18 positioned above it is a border portion between a recorded region and an unrecorded region (laser position C shown in FIG. 14).

As shown in FIG. 9(a), when the laser beam is at laser position A during playback, a large number of recording marks M corresponding to the recorded data is present within the beam spot shined upon the upper recording film 18. In addition, the portions other than the portions where the recording marks M are formed are in the first crystalline state. In this case, as described above, the recorded data is represented by the lengths of the various recording marks and the lengths between recording marks (edge-to-edge), so the duty of the recording marks becomes roughly 50%, and the recording marks M and crystalline regions C1 are present in a certain fixed proportion within the beam spot shined upon the upper recording film 18. Accordingly, the average reflectance within the beam spot shined onto the upper recording film 18 becomes a certain determined value, specifically taking a value nearly intermediate between the reflectivity (approximately 5%) of the (amorphous) portions where the recording marks M are formed and the reflectivity (approximately 9%) of the (first crystalline) portions where no recording marks M are formed.

In addition, as shown in FIG. 9(b), when the laser beam is at laser position B during playback, as described above, recording marks M of a length corresponding to 2T are formed with 50% duty within the beam spot shined upon the upper recording film 18, in the averaged state as described above. In addition, the portions other than the portions where the recording marks M are formed are in the first crystalline state. Thus, the recording marks M and crystalline regions C1 are present in essentially the same proportion within the beam spot shined upon the upper recording film 18. Accordingly, the average reflectance within the beam spot shined onto the upper recording film 18 becomes essentially the same value as in the case in which the laser beam is at laser position A.

Moreover, as shown in FIG. 9(c), when the laser beam is at laser position C during playback, within the beam spot shined upon the upper recording film 18, a large number of recording marks M corresponding to the recorded data is present on one side of the region (the inside) divided along the track direction, while recording marks M of a length corresponding to 2T are formed with 50% duty on the other side of the region (the outside). In addition, the portions other than the portions where the recording marks M are formed are in the first crystalline state. Thus, within the beam spot shined upon the upper recording film 18, the recording marks M and crystalline regions C1 are present in essentially the same proportion within the one side of the region (the inside) and the other side of the region (the outside). Accordingly, the average reflectance of the entire beam spot shined onto the upper recording film 18 becomes essentially the same value as in the cases in which the laser beam is at laser positions A or B.

Thus, in this preferred embodiment, when the focus of the laser beam is aligned to the lower recording film 14 during playback, as shown in FIGS. 9(a)-(c), the average reflectivity within the beam spot shined onto the upper recording film 18 becomes nearly constant regardless of the position of the laser beam, and the distribution of reflectivity within the beam spot shined onto the upper recording film 18 also becomes nearly constant. Thus, in this preferred embodiment, the playback of data recorded in the lower recording film 14 is virtually unaffected by fluctuations in the upper recording film 18, so the playback of data can be performed extremely stably.

Figure 10:
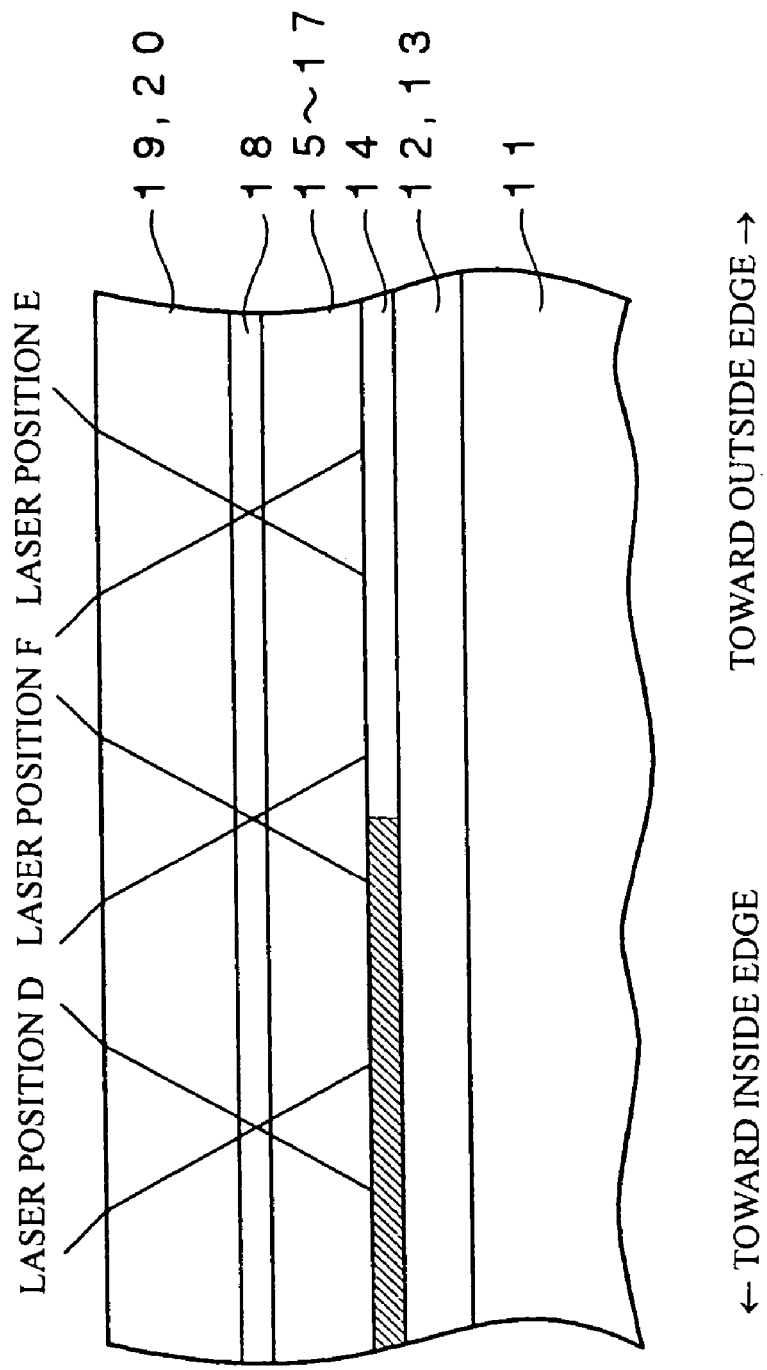
FIG. 10 is a schematic cross section illustrating the path of the laser beam at the time that the laser beam is focused on the upper recording film 18 during playback in three cases: when the lower recording film 14 positioned below is a recorded region (laser position D), when it is an unrecorded region (laser position E), and when it is a boundary portion between the recorded region and unrecorded region (laser position F).

FIG. 10 is a schematic cross section illustrating the path of the laser beam at the time that the laser beam is focused on the upper recording film 18 during playback in three cases: when the lower recording film 14 positioned below is a recorded region (laser position D), when it is an unrecorded region (laser position E), and when it is a boundary portion between the recorded region and unrecorded region (laser position F).

When the laser beam is at laser position D during playback, in the same manner as the state within the beam spot corresponding to laser position A shown in FIG. 9(a), a large number of recording marks M corresponding to the recorded data is present within the beam spot shined onto the lower recording film 14. In addition, when the laser beam is at laser position E during playback, in the same manner as the state within the beam spot corresponding to laser position B shown in FIG. 9(b), recording marks M of a length corresponding 2T are formed with a duty of approximately 50% within the beam spot shined onto the lower recording film 14. Moreover, when the laser beam is at laser position F during playback, in the same manner as the state within the beam spot corresponding to laser position C shown in FIG. 9(c), within the beam spot shined upon the lower recording film 14, a large number of recording marks M corresponding to the recorded data is present on one side of the region divided along the track direction, while recording marks M of a length corresponding to 2T are formed with approximately 50% duty on the other side of the region.

Thus, in this preferred embodiment, when the focus of the laser beam is aligned to the upper recording film 18 during playback, in the same manner as the state illustrated in FIG. 9(a)-(c), the average reflectivity is nearly constant within the beam spot shined onto the lower recording film 14 and the reflectivity distribution is also nearly constant within the beam spot shined onto the lower recording film 14. Thus, in this preferred embodiment, the playback of data recorded on the upper recording film 18 is virtually unaffected by fluctuations in the lower recording film 14, so the playback of data can be performed extremely stably.

The fact that the playback of data recorded on the lower recording film 14 is virtually unaffected by fluctuations in the upper recording film 18, and the playback of data recorded on the upper recording film 18 is virtually unaffected by fluctuations in the lower recording film 14 in this manner means that during the recording of data, the recording of data on the lower recording film 14 is also virtually unaffected by fluctuations in the upper recording film 18, and the recording of data on the upper recording film 18 is also virtually unaffected by fluctuations in the lower recording film 14. Accordingly, in this preferred embodiment, the recording of data on the lower recording film 14 and upper recording film 18 can also be performed extremely stably.

As described above, in the initialization process, the optical recording medium 10 according to this preferred embodiment has nearly the entire surface of the lower recording film 14 and upper recording film 18 crystallized and then recording marks of a length corresponding to 2T are formed with a duty of 50%, so the playback of data can be performed extremely stably regardless of the recording position.

Here follows a description of another preferred embodiment of the present invention.

In contrast to the optical recording medium 10 according to the aforementioned preferred embodiment where recording marks of a length corresponding to 2T are formed in advance with a duty of approximately 50% in unrecorded regions of the lower recording film 14 and upper recording film 18, the optical recording medium 40 according to this preferred embodiment differs on the point in that rectangular amorphous areas with a length in the direction along the tracks longer than, and a length in the direction perpendicular to the tracks shorter than the diameter of the beam spot shined on the upper recording film 18 positioned above when the focus of the laser beam is aligned to the lower recording film 14 during playback and/or the diameter of the beam spot shined on the lower recording film 14 positioned below when the focus of the laser beam is aligned to the upper recording film 18 during playback, are formed over nearly the entire surface of the lower recording film 14 and the upper recording film 18 with a duty of approximately 50% in the unrecorded state. Other than this point, it has the same structure as the optical recording medium 10 described above.

Figure 11:
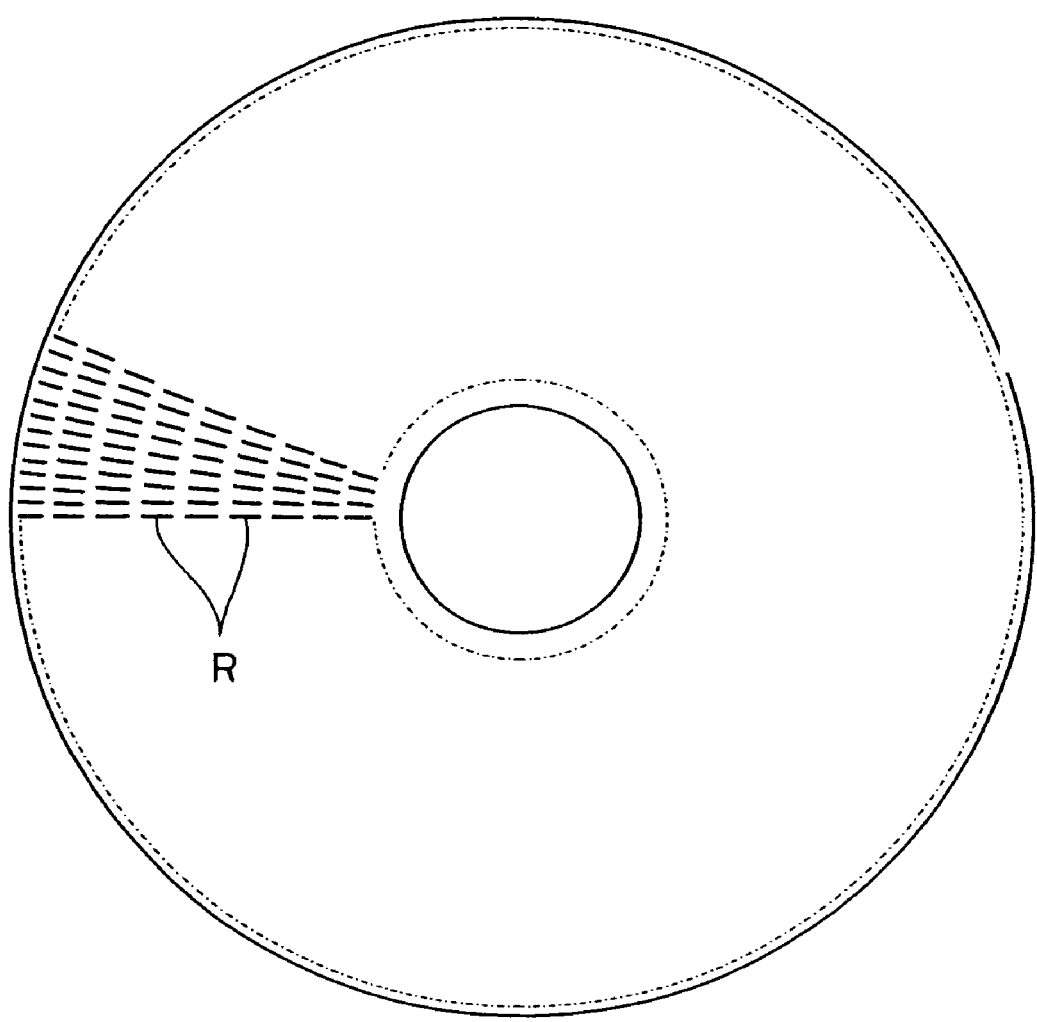
FIG. 11 is a partial top view illustrating the phase state of the lower recording film 14 in the optical recording medium 40 according to another preferred embodiment of the present invention.

FIG. 11 is a partial top view illustrating the phase state of the lower recording film 14 in the optical recording medium 40 according to another preferred embodiment of the present invention.

As shown in FIG. 11, rectangular amorphous regions R are formed radially with a duty of approximately 50% over nearly the entire surface of the lower recording film 14 of the optical recording medium 40 according to this preferred embodiment. While this is not a particular limitation, the rectangular amorphous regions R preferably measure approximately 2 μm or less in the direction along the track and approximately 10 μm or less in the direction perpendicular to the tracks.

In the method of manufacturing such a optical recording medium 40, the fusion initialization process in the manufacture of the aforementioned optical recording medium 10 is replaced by another fusion initialization process whereby the rectangular laser beam is shined continuously on the lower recording film 14 and upper recording film 18 as its power is switched among two levels, thereby forming rectangular amorphous regions R and the first crystalline region C1 radially at a duty of approximately 50%. Thereby, the average reflectivity of the lower recording film 14 and upper recording film 18 assumes a value between the reflectivity in the amorphous state and the reflectivity in the first crystalline state. That is, it is averaged. This completes the optical recording medium 40 according to this preferred embodiment.

Figure 12:
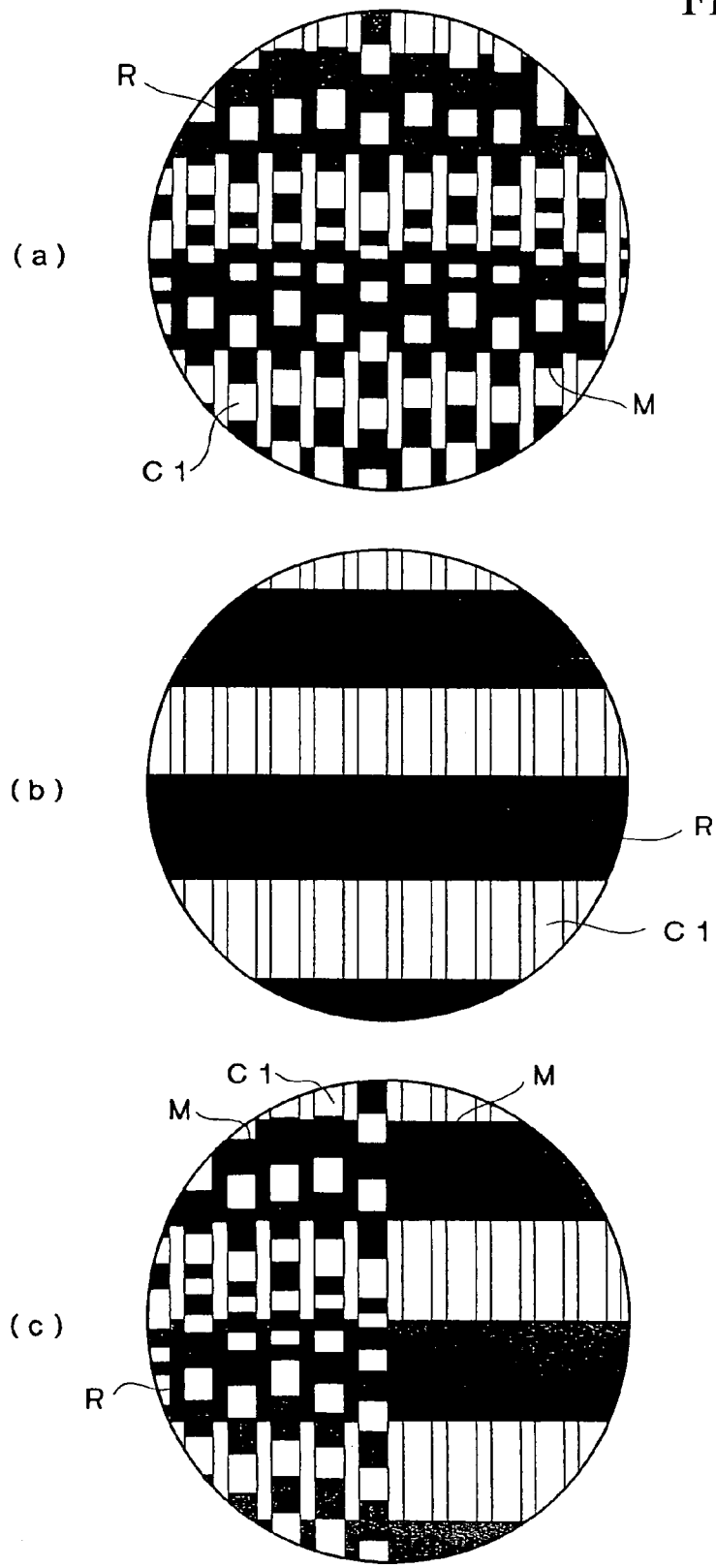
FIGS. 12(a)-(c) are schematic top views of the state within the beam spot shined onto the upper recording film 18 in the optical recording medium 40, when the laser beam is at the laser positions A, B and C, respectively, during playback.

FIG. 12(a) is a schematic top view of the phase state within the beam spot shined onto the upper recording film 18, when the focus of the laser beam is aligned to the lower recording film 14 during playback and the upper recording film 18 positioned above it is a recorded region (the laser position A shown in FIG. 14). FIG. 12(b) is a schematic top view of the phase state within the beam spot shined onto the upper recording film 18, when the focus of the laser beam is aligned to the lower recording film 14 during playback and the upper recording film 18 positioned above it is an unrecorded region (the laser position B shown in FIG. 14). FIG. 12(c) is a schematic top view of the phase state within the beam spot shined onto the upper recording film 18, when the focus of the laser beam is aligned to the lower recording film 14 during playback and the upper recording film 18 positioned above it is a border portion between a recorded region and an unrecorded region (the laser position C shown in FIG. 14).

As shown in FIG. 12(a), when the laser beam is at laser position A during playback, a large number of recording marks M corresponding to the data recorded in the regions along the tracks are present within the beam spot shined onto the upper recording film 18. In addition, portions of the rectangular amorphous regions R remain between the tracks. In addition, the portions other than the portions where the rectangular amorphous regions R remain are in the first crystalline state. In this case, the duty of the recording marks is roughly 50% as described above, and the duty of those portions of the rectangular amorphous regions R remaining between the tracks is also roughly 50%, so the amorphous regions (portions on which recording marks M are formed and portions on which a portion of the rectangular amorphous regions R remain) and the first crystalline regions C1 are present in substantially the same proportions. Accordingly, the average reflectivity within the beam spot shined onto the upper recording film 18 nearly matches a value intermediate between the reflectivity in the amorphous state (approximately 5%) and the reflectivity in the first crystalline state (approximately 9%).

In addition, as shown in FIG. 12(b), when the laser beam is at laser position B during playback, the area within the beam spot shined onto the upper recording film 18 is in the averaged state, so rectangular amorphous regions R are formed with a duty of approximately 50%. In addition, the portions other than the portions where the rectangular amorphous regions R remain are in the first crystalline state. Thus, within the beam spot shined onto the upper recording film 18, the rectangular amorphous regions R and the first crystalline regions C1 are present in substantially the same proportions. Accordingly, the average reflectivity within the beam spot shined onto the upper recording film 18 nearly matches a value intermediate between the reflectivity in the amorphous state (approximately 5%) and the reflectivity in the first crystalline state (approximately 9%).

Moreover, as shown in FIG. 12(c), when the laser beam is at laser position C during playback, within the beam spot shined upon the upper recording film 18, a large number of recording marks M corresponding to the recorded data is present on one side of the region (the inside) divided along the track direction, while rectangular amorphous regions R are formed with 50% duty on the other side of the region (the outside). In addition, portions of the rectangular amorphous regions R remain between the tracks on the one region (the inside). The other portions are in the first crystalline state. Thus, within the beam spot shined upon the upper recording film 18, the amorphous regions (portions on which recording marks M are formed and portions on which a portion of the rectangular amorphous regions R remain) and the first crystalline regions C1 are present in essentially the same proportion within the one side of the region (the inside) and the other side of the region (the outside). Accordingly, the average reflectivity within the beam spot shined onto the upper recording film 18 nearly matches a value intermediate between the reflectivity in the amorphous state (approximately 5%) and the reflectivity in the first crystalline state (approximately 9%).

Thus, in this preferred embodiment, when the focus of the laser beam is aligned to the lower recording film 14 during playback, as shown in FIGS. 12(a)-(c), the average reflectivity within the beam spot shined onto the upper recording film 18 becomes nearly constant regardless of the position of the laser beam, and the distribution of reflectivity within the beam spot shined onto the upper recording film 18 also becomes nearly constant. Thus, in this preferred embodiment, the playback of data recorded in the lower recording film 14 is virtually unaffected by fluctuations in the upper recording film 18, so the playback of data can be performed extremely stably.

This same effect is obtained in the case that the focus of the laser beam is aligned to the upper recording film 18 during playback, and when the laser beam is at laser position D shown in FIG. 10, the phase state within the beam spot shined onto the lower recording film 14 is in the state indicated in FIG. 12(a), when the laser beam is at laser position E shown in FIG. 10, the phase state within the beam spot shined onto the lower recording film 14 is in the state indicated in FIG. 12(b), and when the laser beam is at laser position F shown in FIG. 10, the phase state within the beam spot shined onto the lower recording film 14 is in the state indicated in FIG. 12(c). Thus, in this preferred embodiment, when the focus of the laser beam is aligned to the upper recording film 18 during playback, the average reflectivity within the beam spot shined onto the lower recording film 14 becomes nearly constant regardless of the position of the laser beam, and the distribution of reflectivity within the beam spot shined onto the lower recording film 14 also becomes nearly constant. Thus, in this preferred embodiment, the playback of data recorded in the lower recording film 14 is virtually unaffected by fluctuations in the upper recording film 18, so the playback of data can be performed extremely stably.

The fact that the playback of data recorded on the lower recording film 14 is virtually unaffected by fluctuations in the upper recording film 18, and the playback of data recorded on the upper recording film 18 is virtually unaffected by fluctuations in the lower recording film 14 in this manner means that during the recording of data, the recording of data on the lower recording film 14 is also virtually unaffected by fluctuations in the upper recording film 18, and the recording of data on the upper recording film 18 is also virtually unaffected by fluctuations in the lower recording film 14. Accordingly, in this preferred embodiment, the recording of data on the lower recording film 14 and upper recording film 18 can also be performed extremely stably.

Here follows a description of still another preferred embodiment of the present invention.

The optical recording medium 50 according to this preferred embodiment has the reflectivity of the entire surface in the unrecorded regions of the lower recording film 14 and the upper recording film 18 set nearly uniformly to a value between the reflectivity in the first crystalline state and the reflectivity in the amorphous state. Other than this point, it has the same structure as the optical recording medium 10 described above.

As described above, when the lower recording film 14 and upper recording film 18 are made of AgInSbTe, the reflectivity of the upper recording layer in the first crystalline state is approximately 9% and the reflectivity of the upper recording layer in the amorphous state is approximately 5%, so the reflectivity in the unrecorded regions of the lower recording film 14 and the upper recording film 18 is set to between approximately 5% and approximately 9%. In this case, this is preferably set to a value roughly midway between the optical reflectivity in the first crystalline state and the optical reflectivity in the amorphous state.

In the manufacture of such an optical recording medium 50, the fusion initialization process in the manufacture of the aforementioned optical recording medium 10 is replaced by the "solid-phase initialization process." The solid-phase initialization process is performed by lowering the intensity of the laser beam used in the aforementioned fusion initialization process. Thereby, the AgInSbTe making up the lower recording film 14 and upper recording film 18 is heated to a temperature above the crystallization temperature and less than the melting point and then gradually cooled. This completes the optical recording medium 50 according to this preferred embodiment. When solid-phase initialization is performed, the grain size of the crystals becomes smaller than when fusion initialization is performed, and for this reason, its reflectivity becomes somewhat lower than the reflectivity in the first crystalline state. That is, it is averaged. In this specification, the crystalline state formed by the solid-phase initialization process is called the "second crystalline state" and those portions of the lower recording film 14 and upper recording film 18 that are put into the second crystalline state are called the "second crystalline region C2."

Figure 13:
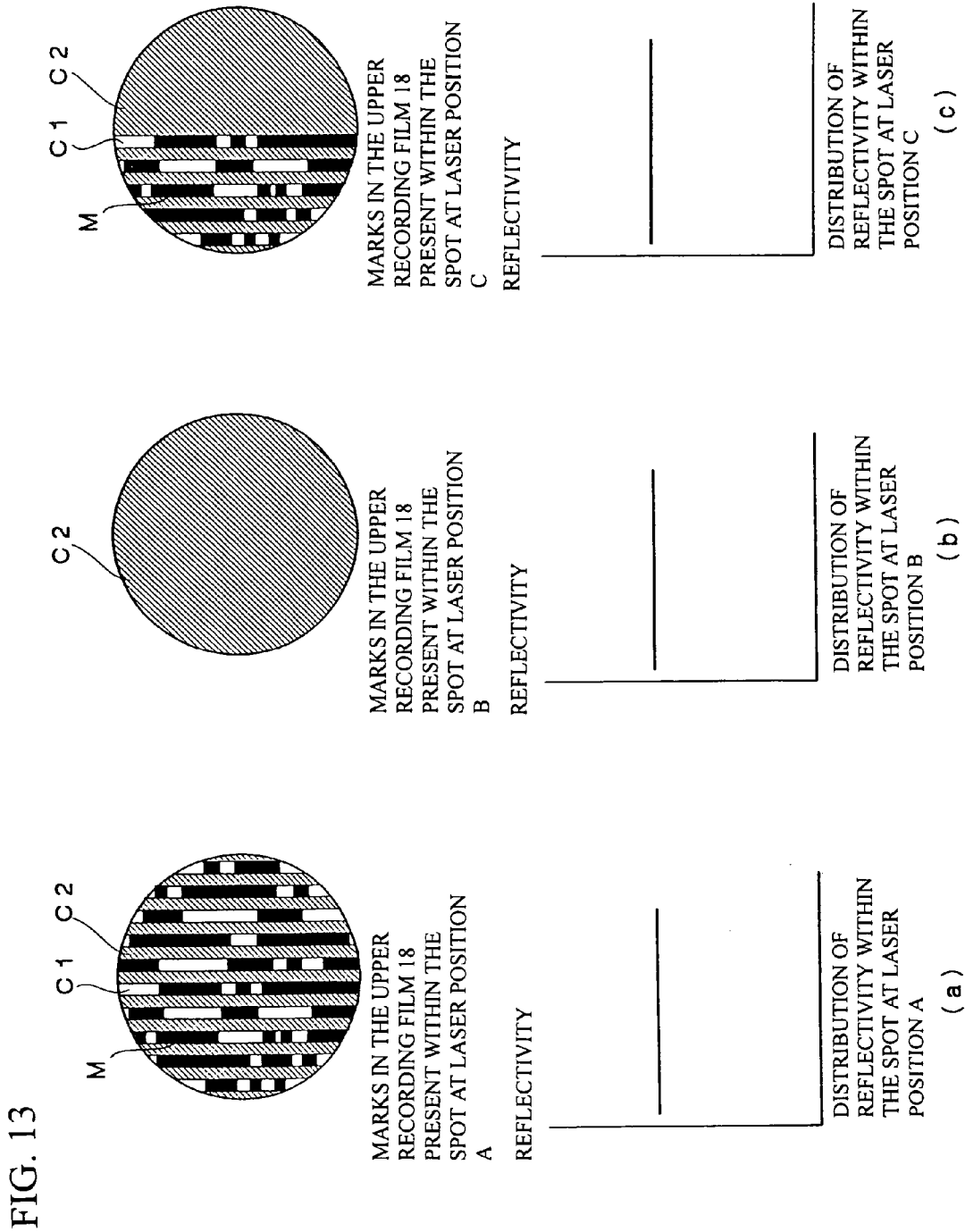
FIGS. 13(a)-(c) are schematic top views of the state within the beam spot shined onto the upper recording film 18 in the optical recording medium 10 according to still another preferred embodiment of the present invention, when the laser beam is at the laser positions A, B and C, respectively, during playback.

FIG. 13(a) is a schematic top view of the phase state within the beam spot shined onto the upper recording film 18, when the focus of the laser beam is aligned to the lower recording film 14 during playback and the upper recording film 18 positioned above it is a recorded region (the laser position A shown in FIG. 14). FIG. 13(b) is a schematic top view of the phase state within the beam spot shined onto the upper recording film 18, when the focus of the laser beam is aligned to the lower recording film 14 during playback and the upper recording film 18 positioned above it is an unrecorded region (the laser position B shown in FIG. 14). FIG. 13(c) is a schematic top view of the phase state within the beam spot shined onto the upper recording film 18, when the focus of the laser beam is aligned to the lower recording film 14 during playback and the upper recording film 18 positioned above it is a border portion between a recorded region and an unrecorded region (the laser position C shown in FIG. 14).

As shown in FIG. 13(a), when the laser beam is at laser position A during playback, a large number of recording marks M corresponding to the data recorded in the regions along the tracks is present within the beam spot shined onto the upper recording film 18. In addition, the areas between the tracks are in the second crystallization state after solid-phase initialization. Accordingly, within the beam spot shined onto the upper recording film 18, the recording marks M, the first crystalline regions C1 and the second crystalline regions C2 are present in predetermined proportions. Accordingly, the average reflectivity within the beam spot shined onto the upper recording film 18 also assumes a certain defined value, specifically a value identical to or close to the reflectivity in the second crystalline state.

In addition, as shown in FIG. 13(b), when the laser beam is at laser position B during playback, the area within the beam spot shined onto the upper recording film 18 is in the second crystallization state after solid-phase initialization. Accordingly, the average reflectivity within the beam spot shined onto the upper recording film 18 matches the reflectivity in the second crystalline state.

Moreover, as shown in FIG. 13(c), when the laser beam is at laser position C during playback, within the beam spot shined upon the upper recording film 18, on one side of the region (the inside) divided along the track direction is in the same state as within the beam spot shown in FIG. 13(a), while the other side of the region (the outside) is all in the second crystallization state after solid-phase initialization. Accordingly, the average reflectivity within the beam spot shined onto the upper recording film 18 is a value equal to or very close to the reflectivity in the second crystalline state.

Thus, in this preferred embodiment, when the focus of the laser beam is aligned to the lower recording film 14 during playback, as shown in FIGS. 13(a)-(c), the average reflectivity within the beam spot shined onto the upper recording film 18 becomes nearly constant regardless of the position of the laser beam, and the distribution of reflectivity within the beam spot shined onto the upper recording film 18 also becomes nearly constant. Thus, in this preferred embodiment, the playback of data recorded in the lower recording film 14 is virtually unaffected by fluctuations in the upper recording film 18, so the playback of data can be performed extremely stably.

This same effect is obtained in the case that the focus of the laser beam is aligned to the upper recording film 18 during playback, and when the laser beam is at laser position D shown in FIG. 10, the phase state within the beam spot shined onto the lower recording film 14 is in the state indicated in FIG. 13(a), when the laser beam is at laser position E shown in FIG. 10, the phase state within the beam spot shined onto the lower recording film 14 is in the state indicated in FIG. 13(b), and when the laser beam is at laser position F shown in FIG. 10, the phase state within the beam spot shined onto the lower recording film 14 is in the state indicated in FIG. 13(c). Thus, even when the focus of the laser beam is aligned to the upper recording film 18 during playback, the average reflectivity within the beam spot shined onto the lower recording film 14 becomes nearly constant regardless of the position of the laser beam, and the distribution of reflectivity within the beam spot shined onto the lower recording film 14 also becomes nearly constant. Thus, in this preferred embodiment, the playback of data recorded in the lower recording film 14 is virtually unaffected by fluctuations in the upper recording film 18, so the playback of data can be performed extremely stably.

The fact that the playback of data recorded on the lower recording film 14 is virtually unaffected by fluctuations in the upper recording film 18, and the playback of data recorded on the upper recording film 18 is virtually unaffected by fluctuations in the lower recording film 14 in this manner means that during the recording of data, the recording of data on the lower recording film 14 is also virtually unaffected by fluctuations in the upper recording film 18, and the recording of data on the upper recording film 18 is also virtually unaffected by fluctuations in the lower recording film 14. Accordingly, the recording of data on the lower recording film 14 and upper recording film 18 can also be performed extremely stably.

The present invention is in no way limited to the aforementioned embodiment, but rather various modifications are possible within the scope of the invention as recited in the claims, and these are naturally included within the scope of the invention.

For example, in the preferred embodiment above, an optical recording medium having two recording layers was described, but the optical recording media to which the present invention applies are not limited thereto so the present invention is also applicable to optical recording media having three or more recording layers. In addition, the "information recording layer" in this specification may also be a read-only information recording layer as long as information is recorded thereupon such that it can be read. In this case, the substrate upon which pre-pits are formed or the surface of the light transmission layer becomes the "information recording layer." However, with the present invention, it is required that at least one of a plurality of information recording layers be an information recording layer containing a recording film to which information can be recorded.

In addition, with the optical recording media 10, 40 and 50, averaging is performed on both the lower recording film 14 and the upper recording film 18, but it is not mandatory that averaging be performed on both the lower recording film 14 and the upper recording film 18, but it is sufficient to perform averaging on at least one recording layer. Here, the effects of other recording layers when the recording/playback of data is performed are greater from recording layers higher than the recording layer subject to recording/playback than from recording layers lower than the recording layer subject to recording/playback, so if only some of the recording layers are averaged, it is preferable to perform the averaging on higher recording layers.

Moreover, with the optical recording medium 10 according to the preferred embodiment above, recording marks of a length corresponding to 2T are formed with a duty of 50% to perform averaging, yet the recording marks that can be utilized for averaging are not limited to recording marks of a length corresponding to 2T but rather recording marks of another length can also be used. However, it is preferable to use recording marks of a shorter length in order to perform even higher-precision averaging. In addition, the number of types of recording marks that can be used for averaging is not limited to one type, but rather averaging may also be performed by mixing a number of types of recording marks. Moreover, the duty of the recording marks is not limited to 50% but rather the duty may also be set to a value higher or lower than this. However, it is preferable that the duty of the recording mark be closer to 50% in order to make the average reflectivity in the unrecorded regions closer to the average reflectivity in the recorded regions.

In addition, in the optical recording medium 40 according to the aforementioned preferred embodiment, averaging is performed by forming rectangular amorphous regions with their length in the direction along the tracks shorter and their length in the direction perpendicular to the tracks longer, but conversely, averaging may also be performed by forming rectangular amorphous regions with their length in the direction along the tracks longer and their length in the direction perpendicular to the tracks shorter. However, in order to minimize the effect on tracking, it is preferable to set the length in the direction along the tracks shorter and their length in the direction perpendicular to the tracks longer. In addition, the orientation of these rectangles may also be oblique with respect to the tracks. Accordingly, averaging may also be performed by forming spiral amorphous regions reaching from the inside edge to the outside edge of the recording layer. In this case, it is preferable to reduce the effect on tracking by making the number of turns of this spiral considerably fewer than the number of turns of the pre-groove. Moreover, it is also preferable to reduce the effect on tracking by setting the spiral direction of this spiral opposite to the spiral direction of the pre-groove.

Moreover, the film formation process described using FIG. 4 through FIG. 8 is only one example, so the optical recording medium precursor may be fabricated by means of a different film formation process. For example, the optical recording medium precursor may also be fabricated by gluing together two deposited substrates with a pre-groove formed on each.

As described above, with the present invention, in an optical recording medium with a plurality of recording layers, the average reflectivity of the recording layers in the unrecorded state is close to the average reflectivity of the recording layers in the recorded state, so the recording/playback of data recorded on one recording layer is less affected by fluctuations in other recording layers. Thus, with the present invention, the stable recording/playback of data can be performed.

The invention claimed is:

1. A method of manufacturing an optical recording medium that has a plurality of laminated information recording layers, wherein said method of manufacturing an optical recording medium comprises:

performing solid-phase initialization of at least one information recording layer among said plurality of information recording layers; and lowering an intensity of a laser beam from the intensity of the laser beam used in a fusion initialization process, wherein a grain size of a plurality of crystals in the information recording layer is smaller than a corresponding grain size in crystals of an information recording layer formed in the fusion initialization process.

2. A method of manufacturing an optical recording medium that has a plurality of laminated information recording layers, wherein said method of manufacturing an optical recording medium comprises:

performing solid-phase initialization of at least one information recording layer among said plurality of information recording layers; and lowering an intensity of a laser beam from the intensity of the laser beam used in a fusion initialization process, wherein a reflectivity of the information recording layer is lower than a corresponding reflectivity of an information recording layer formed in the fusion initialization process.

* * * * *